April 12, 1932. A. PENN 1,853,452
LUBRICANT PRESSURE ACTUATED CONTROL DEVICE
Filed July 16, 1928
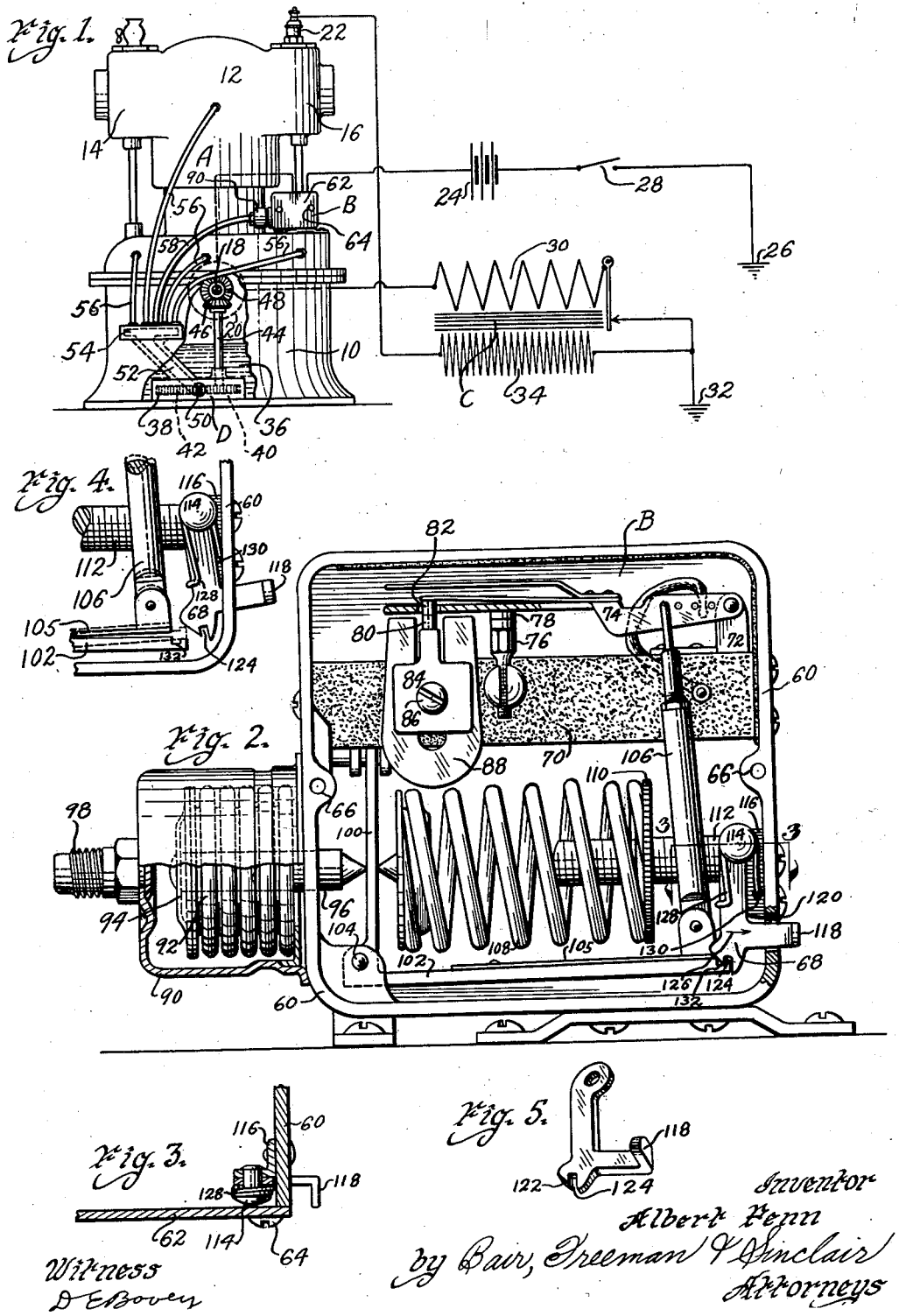

Patented Apr. 12, 1932

1,853,452

UNITED STATES PATENT OFFICE

ALBERT PENN, OF DES MOINES, IOWA, ASSIGNOR TO PENN ELECTRIC SWITCH CO., OF DES MOINES, IOWA, A CORPORATION OF IOWA

LUBRICANT PRESSURE ACTUATED CONTROL DEVICE

Application filed July 16, 1928. Serial No. 293,271.

The object of my invention is to provide a control device adapted to be applied to any type of machine having a lubrication system whereby the machine may be stopped upon failure of such lubrication, the parts of the device being simple, durable and comparatively inexpensive.

More particularly it is my object to provide a controlling device which is pressure actuated and connected with a lubricant under pressure system used in connection with a machine, the device having a control switch therein for stopping the machine upon reduction of the lubricant pressure to a predetermined point.

Still a further object is to provide in connection with an ignition system and a pressure oil system, a means actuated by the oil pressure for rendering the ignition system inoperative upon reduction of the oil pressure to a predetermined point.

Still another object is to provide manually operated means for closing the ignition circuit while the engine is being started, whereafter the oil pressure built-up by the engine as it runs will render the manually operated means inoperative and the oil pressure can then serve to break the ignition circuit upon failure of the oil pressure.

With these and other objects in view my invention consists in the construction, arrangement and combination of the various parts of my device, whereby the objects contemplated are attained, as hereinafter more fully set forth, pointed out in my claims and illustrated in the accompanying drawings.

Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which:

Figure 1 illustrates an internal combustion engine showing my control device applied thereto and in connection with the ignition system and the lubricating system of the engine.

Figure 2 is an enlarged view of the control device showing the cover plate removed and parts of the device in section.

Figure 3 is a detail sectional view on the line 3—3 of Figure 2.

Figure 4 is a view of the lower right hand corner of Figure 2, illustrating the parts in a different position; and Figure 5 illustrates a manually operated latch used in connection with my device.

In the operation of internal combustion engines either in automobiles or tractors or when used in connection with air compressors, refrigerating plants and the like, a lubrication system is usually provided for oiling the various moving parts of the engine. The lubricant is usually supplied under pressure by a pump operated from the engine itself. Sometimes, the oil circulation fails due to the breakage of parts of the pump, clogged oil lines or a lack of oil.

It is my purpose to provide a controlling mechanism to stop the engine whereby the serious damage to the engine resulting from any of the above mentioned causes, is eliminated. In this connection, whenever the controlling device stops the engine, the cause of oil pressure failure should be ascertained by the engineer and remedied before again starting the engine.

On the accompanying drawings, I have used the reference character A to indicate generally an engine of the internal combustion type. Briefly the engine A consists of a base 10, cylinder 12, valve chambers 14 and 16 and a crank shaft 18 to which the piston within the cylinder 12 is operatively connected by a connecting rod. The timer of the engine A is indicated at 20 and a spark plug 22 is also provided for igniting compressed gas within the cylinder 12.

In connection with the internal combustion engine, an ignition system of some sort is usually employed. By way of illustration, I have shown a battery 24 having one side grounded at 26 through a switch 28. The other side of the battery 24 is connected in series with my control device B and then with the timer 20. The timer 20 is connected with the primary coil 30 of the spark coil C.

The primary coil 30 is grounded as indicated at 32 for providing a return circuit to the battery 24. The secondary coil 34 of the spark coil C is connected with the ground 32 and with the spark plug 22. From the description of the parts thus far described, it will be obvious that the control device B being connected in series with the circuit of the battery 24, may be utilized by providing a switch therein for the purpose of making or breaking the primary circuit through the coil 30 and thereby allowing the engine A to be operated or causing it to stop.

The base 10 of the engine A provides an oil sump for containing lubricating oil 36. By way of illustration I have shown a gear pump D consisting of a housing 38 submerged in the oil 36 and providing a casing for pump gears 40 and 42. The gear 40 is secured to a shaft 44. The shaft 44 is operatively connected by bevel gears 46 and 48 to the crank shaft 18 of the engine A.

An inlet port 50 is provided in the pump casing 38 and an outlet passage 52 is provided in connection with the pump D. The port 50 is submerged in the oil 36 in a relatively low position within the sump like base 10. The outlet passageway 52 extends to a manifold 54 from which various oil lines 56 lead to different moving parts of the engine for lubricating such parts. An oil tube 58 also extends to the control device B.

The control device B consists of a casing 60 one side of which is covered by a cover plate 62. The cover plate 62 is held in position by screws 64 extending into screw threaded bosses 66 formed in the casing 60. The switch structure B is similar in design and operation to the application for patent of Ralph Penn, Serial Number 193,316, filed May 21, 1927, with the exception of a manually controlled latch member 68 added thereto.

The switch mechanism B is of the pressure actuated type and consists of a supporting bar 70 of insulating material on which the various parts of the switch are mounted. The parts of the switch include a bracket 72 to which a switch arm 74 is pivoted. A stationary contact 76 is adapted to be engaged by a movable contact 78 on the switch arm 74. An auxiliary contact 80 is mounted on the bar 70 and is adapted to be engaged by an auxiliary contact 82 mounted on the switch arm 74. The contact 80 is mounted on a supporting plate 84 which in connection with a screw 86 serves to support a permanent magnet 88 relative to the bar 70.

A bellows casing 90 is mounted on the control device casing 60 and houses a bellows 92. The base of the bellows 92 is sealed relative to the bellows casing 90 and the head 94 thereof has a pin 96 secured thereto. A fitting 98 is connected with the housing 90 and the oil pipe 58 is in communication with the fitting 98.

Within the casing 60, a bell crank having arms 100 and 102 is pivoted at 104. The pin 96 engages the arm 100 of the bell crank. The arm 102 of the bell crank is connected by means of a leaf spring 105 and link 106 to the switch arm 74. The link 106 is adjustable in length.

From the construction of the parts just described, it will be obvious that a pressure of oil produced by the oil pump D and transmitted to the bellows casing 90 will tend to collapse the bellows 92 and thereby move the switch arm 74 towards switch closing position. The action of the bellows 92 is opposed by a spring 108. The spring 108 is adjustable for varying the tension thereof by means of a disc 110 screw threadedly mounted on a pin 112.

The latch 68 is pivoted to a pin 114. The pin 114 is supported by an angle shaped bracket 116 secured to the casing 60. A finger engaging portion 118 is provided on the latch 68 and extends through a slot 120 in the casing 60 whereby the portion 118 projects out of the casing 60. An internal surface 122 and a notch 124 are provided on the latch 68. The latch 68 is normally constrained to move in the direction of the arrow 126, by means of a spring 128 wrapped around the pin 114. One end of the spring 128 extends through an opening 130 in the bracket 116 and the other end thereof engages the latch 68. A notch 132 is provided in the arm 102 of the bell crank.

*Practical operation*

In the operation of my device, when it is desired to start the engine A, the switch 28 usually provided in connection with the primary circuit of an ignition system is moved to closed position. The portion 118 of the latch 68 is then engaged by the finger of the operator and pushed inwardly whereby the inclined surface 122 of the latch will serve to move the outer end of the arm 102 downwardly until the point of the latch 68 between the inclined surface 122 and the notch 124 thereof will engage in the notch 132 of the arm 102.

It may here be mentioned that the arm 102, before starting the engine, will normally be in a raised position due to an absence of the oil pressure within the bellows casing 90 and when the arm 102 is moved downwardly by manipulating the latch 68, the contacts 76, 78, 80 and 82 will be closed for closing the primary circuit of the ignition system of the engine A.

After the engine has been started, an oil pressure will be built-up in the manifold 54 due to the operation of the pump D. Such oil pressure will affect the bellows 92 causing it to partially collapse against the action of the spring 108 for moving the arm 102 to the full line position illustrated in Figure 4 of the drawings.

In such position of the arm 102, the switch arm 74 will remain in closed position and the arm 102 will merely leave the leaf spring 105 as clearly shown. Movement of the arm 102 of the bell crank to the full line position shown in Figure 4, will release the latch 68 so that it can move to the full line position illustrated.

The engine A will now continue to run until the switch 28 is opened for manually stopping the engine or until the contacts 78 and 82 are separated from the contacts 76 and 80. Such automatic operation will be caused by a reduction of oil pressure to such a point that the arm 102 will move to the dotted line position for instance, shown in Figure 4, which will force the armature arm 74 upwardly causing it to leave the strongest portion of the magnetic field of the magnet 88 with a snap action for opening the contacts.

When the engine stops due to the operation of the control device B, it indicates that something has happened to the lubrication system of the engine and should be attended to before the engine is again started. I have shown my device in connection with an internal combustion engine but it can also be used in many other installations where a pressure oil system is provided. For instance, the control device may be used for stopping an electric motor driven air compressor in which an oil system for oiling the compressor is used.

In such an installation, besides controlling the starting switch of the motor, the latch 68 would have to be pressed inwardly before the motor could be started. It will be obvious that my device may be used in a similar capacity on many other types of installations for the purpose of preventing damage to various machines caused by a failure of the oil circulating system when such a system is of a force feed type.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In combination with a machine requiring lubrication by a lubricant under pressure and including means for producing such pressure upon running the machine, a control device adapted to stop said machine after such pressure has been produced and upon such pressure dropping to a predetermined point, and a manually operated latch independent of but coactible with the control device for actuating it to inoperative position while starting the machine.

2. In combination with a machine requiring lubrication by a lubricant under pressure and including means for producing such pressure upon running the machine, a control device adapted to stop said machine after such pressure has been produced and upon such pressure dropping to a predetermined point, a manually operated means for rendering the same inoperative while starting the machine and automatically operated means to render the manually operated means ineffective after the machine has been started without rendering the control means inoperative.

3. In combination with a machine requiring lubrication by a lubricant under pressure and including means for producing such pressure upon running the machine, a control device adapted to stop said machine after such pressure has been produced and upon such pressure dropping to a predetermined point, a manually operated means for rendering the same inoperative while starting the machine and automatically operated means to render the manually operated means ineffective after the machine has been started without rendering the control means inoperative, said automatically operated means being actuated by said control device due to the lubricant pressure produced by the machine.

4. In combination with a machine requiring lubrication by a lubricant under pressure and including means for producing such pressure upon running the machine, a control device adapted to normally stop said machine, manually operated means for rendering said device inoperative to stop said machine, pressure actuated means in communication with the source of lubricant under pressure for rendering said manually operated means inoperative and for thereafter allowing the control device to remain operative while a normal lubricant pressure is maintained and allowing it to assume its normal machine stopping position in the event of failure of such lubricant pressure.

5. In combination with an engine having an ignition system and an oil under pressure lubrication system, a control device connected with said systems for rendering the ignition system inoperative upon failure of the oil pressure of the lubrication system, and a manually operated latch means independent of but coactible with the control device for rendering the ignition system operative while starting said engine.

6. In combination with an engine having an ignition system and an oil under pressure lubrication system, a control device connected with said systems for rendering the ignition system inoperative upon failure of the oil pressure of the lubrication system, a manually operated means for rendering the ignition system operative while starting said engine, and means automatically operated by the lubrication system as it begins to function after the engine is started for rendering the manually operated means inoperative without rendering the control means inoperative.

7. In combination with an engine having an ignition system and an oil under pressure lubrication system, a control device connected with said systems for rendering the ignition system inoperative upon failure of the oil pressure of the lubrication system, a manually operated means for rendering the ignition system operative while starting said engine, and means automatically operated by the lubrication system as it begins to function after the engine is started for rendering the manually operated means inoperative without rendering the control means inoperative, said automatically operated means serving to cause the ignition system to be rendered inoperative.

8. In combination with an engine having an ignition system and an oil under pressure lubrication system, a control device comprising a pressure actuated switch actuated by the oil pressure and electrically connected in the ignition circuit, said switch being normally constrained to remain open and hand operated means independent of but coactible with said control means for closing said switch while starting the engine.

9. In combination with an engine having an ignition system and an oil under pressure lubrication system, a control device comprising a pressure actuated switch actuated by the oil pressure and electrically connected in the ignition circuit, said switch being normally constrained to remain open, hand operated means for closing said switch while starting the engine, said hand operated means but not said control means being rendered inoperative by an increase of oil pressure after the engine is started.

Des Moines, Iowa, June 21, 1928.

ALBERT PENN.